Figure 1:
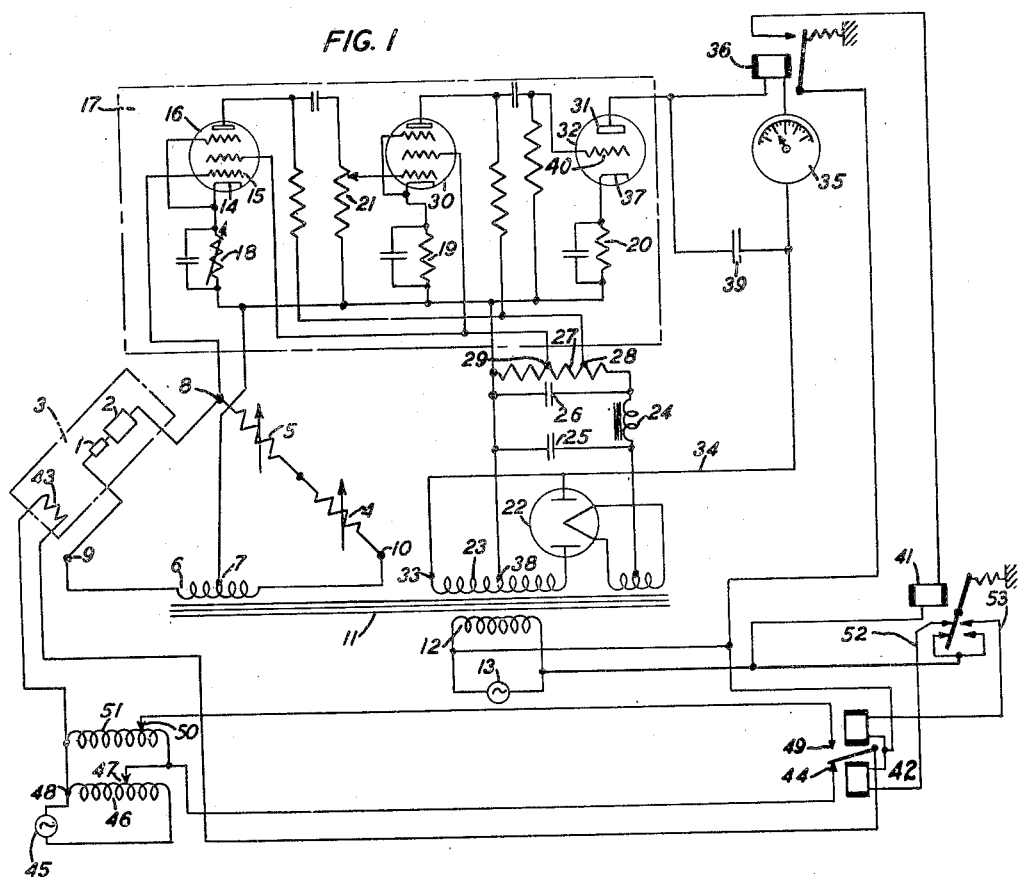

Nov. 22, 1949   R. P. BURLEIGH, JR   2,488,580
TEMPERATURE CONTROL SYSTEM
Filed March 7, 1946

INVENTOR
R. P. BURLEIGH JR.

BY
W. C. Parnell
ATTORNEY

Patented Nov. 22, 1949

2,488,580

UNITED STATES PATENT OFFICE 2,488,580

TEMPERATURE CONTROL SYSTEM

Robert P. Burleigh, Jr., Kew Gardens, N. Y., assignor to Western Electric Company, Incorporated, New York, N. Y., a corporation of New York Application March 7, 1946, Serial No. 652,596

4 Claims. (Cl. 236—78)

This invention relates to temperature control systems and the object of the invention is to regulate the temperature of a work area very accurately at the desired value.

According to the general features of the invention, a thermo-sensitive device disposed in the area to be regulated, and having a resistance which varies widely with temperature variations, forms an element of a network associated with an amplifier and suitable circuits for controlling the supply of heat to the area. The network is so proportioned that there is no input to the amplifier when the device is at exactly the desired temperature and under this condition the heating circuit is in a predetermined condition, that is, heat is or is not being supplied, depending on the type of control desired. A slight increase or decrease in temperature produces a relatively large decrease or increase in the resistance of the device, thereby unbalancing the network to provide input potential for the amplifier which then actuates circuit controls to vary the supply of heat in the proper direction to compensate for the slight temperature variation.

In accordance with an important feature of the invention, the temperature sensitive network and the output stage of the amplifier are energized by alternating current from the same source. Operation of the circuit then depends on proper phase relations between unbalance potentials produced in the network and the potential applied to the output stage so that discrimination between temperature changes in opposite directions can be obtained with a relatively simple control circuit. The system may be adapted to operate with the circuit either closed or open when the network is balanced, and it will be understood that the terms "closed" and "open" may refer to a system wherein the heat supply is adjusted between high heating and low heating conditions, respectively, or to a system wherein the heat supply is continuously varied instead of being switched on and off. The choice of operating conditions will, of course, depend on the requirements of the particular case. In some instances, for example, it may be more important to guard against abnormally high temperatures than abnormally low temperatures, in which case the heating circuit should be open whenever there is no input to the amplifier whether this is due to the temperature being correct or to a failure of the control.

In many temperature control systems the closeness of regulation is limited by the fact that when the control is made very sensitive to temperature variations, the heating circuit is switched so frequently that the system fails to establish a good medium control point.

A further important feature of this invention comprises two thermo-sensitive devices, such as thermistors, connected together in the network, one of the thermistors having a higher time rate of response to changes in ambient temperature than the other. This effect may be obtained, for example, by making one of the thermistors of relatively large, and the other of relatively small, mass. The small or auxiliary thermistor senses minor temperature variations almost instantaneously, but with a proper selection of control sensitivity these momentary changes will not affect the condition of the heating circuit. Yet the circuit may be so adjusted that these changes of resistance in the auxiliary thermistor will change the combined resistance of the two thermistors to a value very close to that required to operate the switching circuit. Then, if the momentary temperature trend persists, the large, or main, thermistor begins to vary in the same direction as the smaller unit and only a slight variation in the resistance of the main unit is required to effect a change in the supply of heat.

Figure 2:
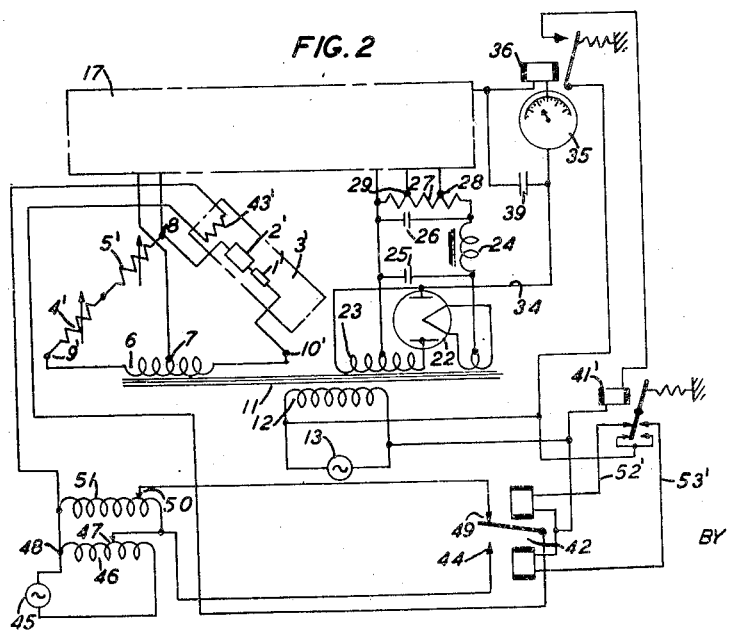

These and other features of the invention will be clearly understood from the following detailed description of the drawing in which Fig. 1 is the circuit diagram of a temperature control system in which the heating circuit is closed except as opened by temperature variations in the controlled area, and Fig. 2 is a modified circuit in which the heating circuit is normally open.

In the circuit of Fig. 1, the thermo-sensitive devices 1 and 2 are thermistors of any suitable type, having a high negative temperature coefficient, disposed within the work area 3, the temperature of which is to be controlled. As indicated in the drawing, the thermistor 2 is of relatively large mass and resistance and the thermistor 1 of relatively small mass and resistance. In one practical application good results were obtained with a pair of thermistors having a resistance ratio of about 10:1 and a mass ratio of the order of 75:1. The large thermistor may, for example, comprise an alloy of copper and manganese oxides and the small thermistor may be an alloy of these metals together with cobalt and nickel. These devices are serially connected with resistors 4 and 5 and the winding 6 to form a bridge circuit which, when properly adjusted, has two pairs of conjugate terminals 7—8 and 9—10, respectively. The maximum resistance of resistor 4 is preferably of the order of 100 times that of resistor 5 and the sum of these resistances is continuously variable over the whole range of resistance in which the thermistors are to be operated.

The winding 6 comprises one secondary of a transformer 11 having a terminal 12 connected to a source of alternating current 13 and it applies suitable alternating potential to the diagonally opposite terminals 9—10 of the bridge. The other terminals 7—8 are respectively connected to the cathode and grid 14 and 15 of the input tube 16 of the amplifier 17 so that any unbalance voltage between this pair of terminals will be suitably amplified by the amplifier. The amplifier shown is essentially a conventional three stage resistance-capacity coupled circuit with by-passed, self-bias resistors 18, 19, 20 and an interstage gain control potentiometer 21 which serves as an adjustment for the degree of sensitivity required, or permissible, without causing undue hunting under the various operating conditions. A conventional full wave rectifier 22 is conveniently energized by another secondary winding 23 of the transformer 11 and the rectified output is suitably filtered by a retard coil 24 and condensers 25 and 26 in the usual manner. A voltage dividing resistor 27 in shunt to the condenser 26 is tapped at 28 and 29 to provide plate and screen grid potentials for the tubes 16 and 30, respectively.

It will be noted that the resistances 4 and 5 of the right hand portion of the winding 6 are connected across the input of the tube 16 and as the resistors are varied under different conditions of use, as explained below, the grid bias of the tube will be correspondingly affected. To prevent this variation of the resistors from causing an excessive reduction of grid bias which might result in unstable operation, the cathode resistor 18 is made variable so that it may be adjusted as required to maintain proper operating bias and gain.

The plate 31 of the output tube 32 is energized by the alternating potential of the left hand portion of the winding 23 over a circuit extending from the winding terminal 33 through conductor 34 and condenser 39, which bypasses the direct current milliammeter 35 and the winding of the direct current relay 36, to the plate 31 and from the cathode 37 to the mid-point 38 of the winding. The plate is therefore positive with respect to the cathode 37 only during alternate half cycles of the plate supply potential and the tube 32 is of a type such as the 6K5, which in the absence of positive grid potential is substantially cut off even on the positive alternations of plate potential. Obviously, a tube of the normally conducting type may be used for this purpose if it is statically biased to cut off, as for example, by returning the cathode to a suitable point of positive potential on the resistor 27. In any case, the current passed by the tube in the absence of control potential on the grid 40 must be so small that the sensitive relay 36 will not operate. In its operated position, the relay 36 operates a relay 41, and this latter relay in turn controls a relay 42 which determines the amount of heat generated by the heating element 43 disposed in the work area 3.

From the foregoing description it will be evident that, in preparing the system for operation, the resistance 18 is set at a value giving proper grid bias on the tube 16, the resistors 4 and 5 are adjusted to balance the bridge when the thermistor resistances have the values corresponding to the desired temperature and the current through relay 36, for a given unbalance of the bridge, is set at a proper value by operating the sensitivity control 21 and observing the meter 35. For convenience in carrying out these operations the resistors 4 and 5 may be calibrated directly in terms of thermistor temperature and the scale of the meter 35 may have a shaded or otherwise marked area indicating the permissible current range for a particular application.

With the system so adjusted and otherwise in the condition shown in Fig. 1, it will be seen that when the thermistors 1 and 2 are exactly at the desired temperature so that their combined resistance will be exactly equal to the adjusted value of resistors 4 and 5, there is no difference of potential between terminals 7 and 8, and hence, no input to the tube 16. Under these conditions, the pulses of plate current in the tube 32 will be less than the value required to operate relay 36, relay 41 will be released, and relay 42 will be operated to engage its lower contact 44. Power for the heating element 43 is supplied from a suitable alternating current source 45, the potential of which is applied directly to an autotransformer 46. A circuit is then complete from the variable contact 47 of the transformer through the contact 44 of the relay and the heating element 43 to the terminal 48 of the transformer, contact 47 being set to give the maximum heating effect required.

This supply of heat will tend to raise the temperature of the area 3 and, as the temperature tends to increase, the resistance of thermistor 1 decreases to be followed by a decrease in the thermistor 2 if the rising trend persists. The resistance between terminals 8 and 9 of the bridge is therefore less than the resistance between terminals 8 and 10, and terminal 8 will be alternately positive and negative with respect to the mid point 7 on successive alternations of the potential in the winding 6. The negative pulses on the grid 15 will, of course, have no effect since the tube 32 at these times is non-conductive due to the negative polarity of the pulses applied to the plate 31 from the winding 33. The positive pulses, however, will be amplified and applied as positive pulses to the grid 40 of the tube 32, and since the pulses at plate 31 are then also positive, the plate current pulses of tube 32 increases in magnitude, operating the relay 36 to cause the successive operation of relays 41 and 42.

The latter relay is then open at contact 44 and closed at contact 49, and the voltage on the element 43 is reduced in accordance with the setting of contact 50 of a second autotransformer 51 which is energized by only the fraction of the supply voltage selected by the autotransformer 46. This reduction in heat supply arrests the tendency of the area 3 to increase in temperature, and as soon as the temperature again tends to fall below its proper value, the increase of the resistance of the thermistors produces an alternating potential between the terminals 7 and 8, which is of instantaneous polarity opposite to that previously produced by rising temperature. Under this condition, the grid 15 of the tube 16 is negative when the plate of tube 32 is positive, the tube 32 is biased to cut off, relays 36 and 41 release and relay 42 breaks its contact 49 and closes contact 44 again to restore the system to the high heat condition. The positive pulses on the grids 15 and 40 in this case occur when the plate 31 is negative and they are therefore incapable of holding the relay 36 operated and the system accordingly discriminates between increases and decreases in temperature of the work area from the desired value. It will be evident that in the event of failure of operation of this automatic regulating circuit, relay 36 will be open and the system will be left in the high heat condition to guard against abnormally low temperatures. With one system of this type used in connection with a chemical bath, it has been found practicable to regulate the bath temperature at 65° C. within ±.01° C.

The system of Fig. 2 is similar to that of Fig. 1 except that it is adapted to reduce the heat supply in the event of failure of control. This is effected by reversing the positions of the thermistors and control point setting resistors 4 and 5 in the bridge and by reversing leads 52 and 53 to the relay 41, the foregoing elements of Fig. 1 being designated in Fig. 2 by corresponding primed numbers. In this modified circuit, the operation is similar to that already described in connection with Fig. 1 except that for a balanced bridge condition, relay 42 is closed on contact 49, the system is operating under low heat condition, and high heat is supplied only when the temperature of the area 3 has shown a falling temperature tendency for a time sufficient to produce significant positive pulses on the grid 15 at the same time that the plate of the tube 32 is positive so that relays 36 and 41 will be operated.

While the invention has been described with respect to particular embodiments for purposes of illustration, it will be understood that the system shown may be modified in various ways in accordance with the general principles of the invention and the requirements of the particular conditions of use. For example, in certain cases only a single thermistor may be required in the bridge and in others it may be desirable to use more than the two units shown, the several units being proportioned with respect to each other in time rates of response to changes in ambient temperature to obtain the speed of operation and sensitivity desired. If for any reason the low heat condition is not required, obviously the transformer 51 may be eliminated and the element 43 operated on a simple "on and off" basis under the control of contact 44. Again, the amplifier is shown as comprising three stages to provide the necessary gain and so that the instantaneous polarity of the potentials on the grids of the input and output tubes will be the same, but obviously this requirement will also be met by any other odd number of stages required to give the necessary control potential on the grid of the output tube.

It should also be understood that an amplifier having an even number of stages may be used if desired. In that case the potentials on the input and output grids will be of opposite polarities, but the system can be made to operate substantially as already described either by providing relay 36 with a back contact for controlling relay 41 or by connecting the plate supply lead 34 to the other plate of the rectifier 22.

What is claimed is:

1. In a temperature control system a network including elements subjected to temperature variations in an area to be controlled, said network being balanced at a predetermined desired temperature of the element, a source of heat for the area and an electronic circuit connected to the network for controlling the supply of heat delivered by the source to the area, a common source of alternating potential for energizing the network and the circuit and means in the circuit selectively responsive to unbalance potential in the network for controlling the heat supply in accordance with the instantaneous relative polarities of the unbalance potential and the potential applied to the electronic circuit, one of the elements being of relatively small mass and resistance compared with the other element.

2. In a temperature control system, a network including two thermo-sensitive impedance elements subjected to temperature variations in an area to be controlled, a source of heat for the area, and an electronic circuit connected to the network for controlling the supply of heat delivered by the source to the area, one of the elements being of relatively small mass to vary its impedance substantially instantaneously with temperature variations, and the other element being of relatively large mass to introduce a predetermined time constant in the change of the combined impedance of the elements.

3. In an automatic temperature control system wherein the heat supplied to the control area is varied in accordance with the variations in impedance of thermo-sensitive means exposed to temperature variations of the area, a thermo-sensitive means comprising two thermistor units having a combined impedance for controlling the heat supply and having different individual impedances and different time rates of response to changes in the ambient temperature of the area, one of the units being of relatively small mass to vary its impedance substantially instaneously with temperature variations, and the other unit being of relatively large mass to introduce a predetermined time constant in the change of the combined impedance of the units.

4. In a temperature control system a thermistor unit of relatively low resistance and a second thermistor unit of relatively high resistance, both disposed in the area in which the temperature is to be controlled, one of the units being of relatively small mass to vary its resistance substantially instantaneously with changes in the temperature of the area, and the other unit being of relatively large mass to introduce a predetermined time constant in the change of the combined resistance of the units, a source of heat supplying heat to the area, electrical connections between the thermistor units, and means responsive to changes in the combined impedance of the units for varying the heat supplied from the source.

ROBERT P. BURLEIGH, Jr.

REFERENCES CITED

The following references are of record in the file of this patent:

UNITED STATES PATENTS

| Number | Name | Date |
| --- | --- | --- |
| 1,643,582 | Martin | Sept. 27, 1927 |
| 1,694,264 | Hull | Dec. 4, 1928 |
| 2,086,966 | Shrader | July 13, 1937 |
| 2,261,343 | DeFlorez et al. | Nov. 4, 1941 |
| 2,290,091 | Brown et al. | July 14, 1942 |
| 2,325,094 | Ashworth | July 27, 1943 |